United States Patent [19]

Yamada

[11] Patent Number: 5,911,014
[45] Date of Patent: Jun. 8, 1999

[54] METHOD AND APPARATUS FOR EXTRACTING AN ABNORMAL PATTERN

[75] Inventor: Masahiko Yamada, Kanagawa-ken, Japan

[73] Assignee: Fuji Photo Film Co., Ltd., Kanagawa-ken, Japan

[21] Appl. No.: 08/917,678

[22] Filed: Aug. 26, 1997

[30] Foreign Application Priority Data

Aug. 26, 1996 [JP] Japan .................................. 8-223870

[51] Int. Cl.$^6$ ..................................................... G06K 9/56
[52] U.S. Cl. ........................... 382/308; 382/132; 382/273
[58] Field of Search .................................... 382/130–133, 382/128–129, 205, 308, 286, 257, 259, 273, 266

[56] References Cited

U.S. PATENT DOCUMENTS 4,809,343  2/1989  Wakabayashi et al. .................. 382/205
4,969,203  11/1990  Herman .................................... 382/266

OTHER PUBLICATIONS

"Extraction of Small Calcified Patterns With a Morphology Filter Using A Muliply Structure Element", Collected Papers of The Institute of Electronics and Communication Engineers of Japan, D–II, vol. J75–D–II, No. 7, pp. 1170–1176, Jul. 1992.

"Fundamentals of Morphology and Its Application to Mammogram Processing", Medical Imaging Technology, vol. 12, No. 1, Jan. 1994.

Primary Examiner—Leo H. Boudreau
Assistant Examiner—Ishrat Sherali
Attorney, Agent, or Firm—Sughrue, Mion, Zinn, Macpeak & Seas, PLLC

[57] ABSTRACT

In closing processing, maximum value processing is carried out with a structure element on an original image signal, and maximum value signals are thereby obtained as intermediate results and stored in an intermediate memory. The intermediate memory has a storage space of (the same number of lines as that of picture elements constituting the structure element)×(the number of picture elements lying on one line in the array of picture elements of the original image). Minimum value processing is then carried out with the structure element on the maximum value signals having been stored along one line in the intermediate memory. Each time the minimum value processing for one line in the intermediate memory is finished, the maximum value signals having been stored in the intermediate memory are shifted back by one line, and the maximum value processing is then carried out for one line in the array of picture elements of the original image. The storage space of the intermediate memory is thereby kept small.

8 Claims, 9 Drawing Sheets

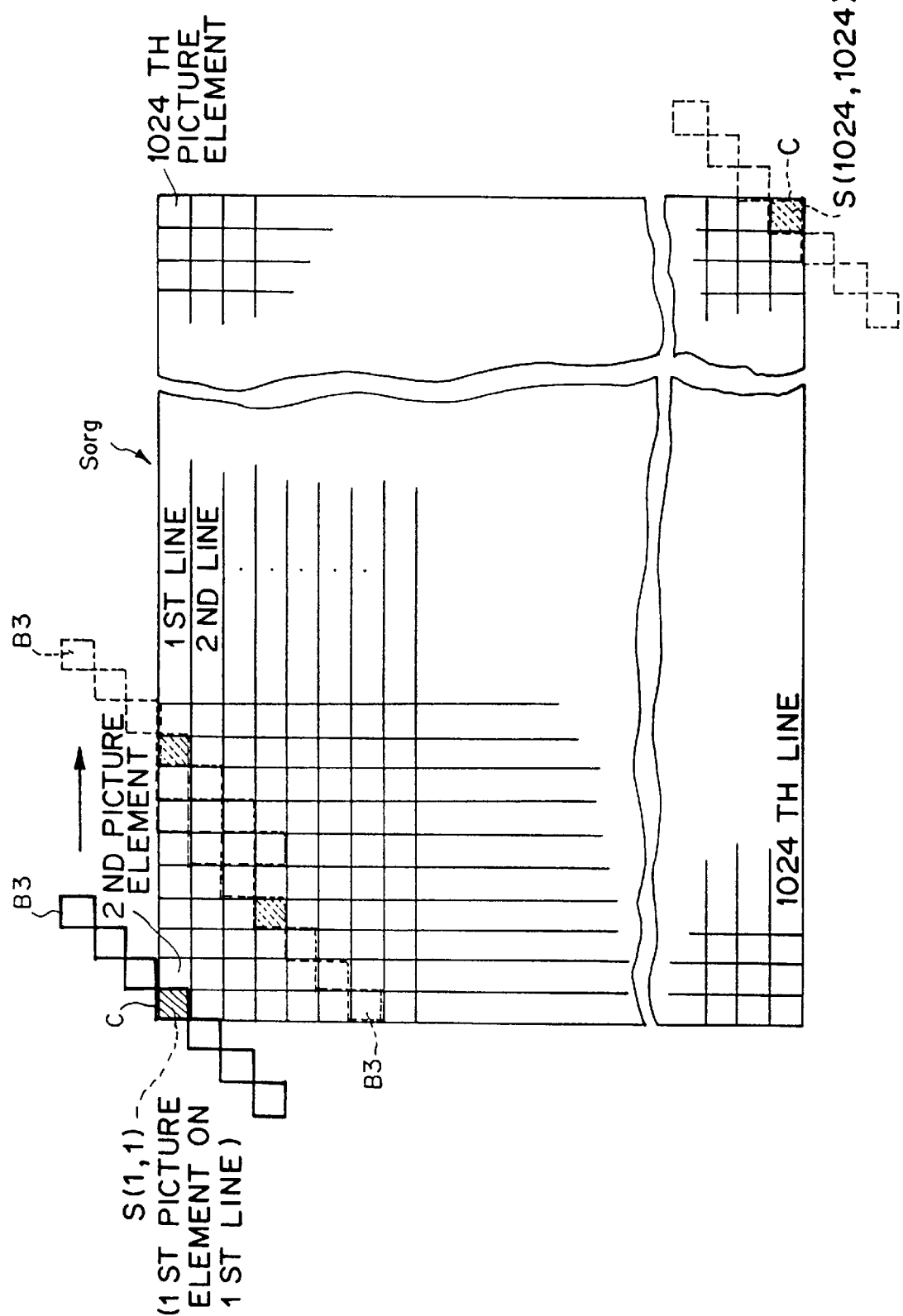

METHOD AND APPARATUS FOR EXTRACTING AN ABNORMAL PATTERN

BACKGROUND OF THE INVENTION

1. Field of the Invention

This invention relates to a method and apparatus for extracting an abnormal pattern from an image. This invention particularly relates to an improvement in a morphology operation for extracting an image portion, which has a characteristic shape, from an original image represented by an original image signal.

2. Description of the Prior Art

Image processing, such as gradation processing or frequency processing, has heretofore been carried out on an original image signal, which represents an original image having been obtained with one of various image obtaining methods, such that a visible image having good image quality can be reproduced and used as an effective tool in, particularly, the accurate and efficient diagnosis of an illness. Particularly, in the field of medical images, such as radiation images of human bodies serving as objects, it is necessary for specialists, such as doctors, to make an accurate diagnosis of an illness or an injury of the patient in accordance with the obtained image. Therefore, it is essential to carry out the image processing in order that a visible image having good image quality can be reproduced and used as an effective tool in the accurate and efficient diagnosis of an illness.

As one of the image processing, there has heretofore been known the processing based upon the algorithm of morphology (hereinbelow referred to as the morphology operation or the morphology processing), with which only a specific image portion, such as an abnormal pattern, is selectively extracted from an original image.

The morphology processing has been studied as a technique efficient for detecting, particularly, a small calcified pattern, which is one of characteristic forms of mammary cancers. However, the image to be processed with the morphology processing is not limited to the small calcified pattern in a mammogram, and the morphology processing is applicable to any kind of image, in which the size and the shape of a specific image portion (i.e., an abnormal pattern, or the like) to be detected are known previously.

The morphology processing is carried out by using a structure element (also referred to as a mask) B corresponding to the size and the shape of the pattern to be extracted. The morphology processing has the features in that, for example, (1) it is efficient for extracting a calcified pattern itself, (2) it is not affected by complicated background information, and (3) the extracted calcified pattern does not become distorted.

Specifically, the morphology processing is advantageous over ordinary differentiation processing in that it can more accurately detect the geometrical information concerning the size, the shape, and the image density distribution of the calcified pattern.

How the morphology processing is carried out will be described hereinbelow by taking the detection of a small calcified pattern in a mammogram as an example.

(Fundamental operation of morphology processing)

In general, the morphology processing is expanded as the theory of sets in an N-dimensional space. As an aid in facilitating the intuitive understanding, the morphology processing will be described hereinbelow with reference to a two-dimensional gray level image.

The gray level image is considered as a space, in which a point having coordinates (x, y) has a height corresponding to an image density value f(x, y). In this case, it is assumed that the image signal representing the image density value f(x, y) is a high luminance-high signal level type of image signal, in which a low image density (i.e., a high luminance when the image is displayed on a CRT display device) is represented by a high image signal level.

Firstly, as an aid in facilitating the explanation, a one-dimensional function f(x) corresponding to the cross-section of the two-dimensional gray level image is considered. It is assumed that a structure element g used in the morphology operation is a symmetric function of Formula (1) shown below, which is symmetric with respect to the origin.

$$g^s(x) = g(-x) \quad (1)$$

It is also assumed that the value is 0 in a domain of definition G, which is represented by Formula (2) shown below.

$$G = \{-m, -m+1, \ldots, -1, 0, 1, \ldots, m-1, m\} \quad (2)$$

In such cases, the fundamental forms of the morphology operation are very simple operations carried out with Formulas (3), (4), (5), and (6) shown below.

$$\text{dilation: } [f \oplus G^s](i) = \max\{f(i-m), \ldots, f(i), \ldots, f(i+m)\} \quad (3)$$

$$\text{erosion: } [f \ominus G^s](i) = \min\{f(i-m), \ldots, f(i), \ldots, f(i+m)\} \quad (4)$$

$$\text{opening: } f_g = (f \ominus g^s) \oplus g \quad (5)$$

$$\text{closing: } f^g = (f \oplus g^s) \ominus g \quad (6)$$

Specifically, as illustrated in FIG. 7A, the dilation processing is the processing for retrieving the maximum value in the region of a width of ±m (which width is the value determined in accordance with the structure element B and corresponds to the mask size shown in FIG. 7A) having its center at a picture element of interest. As illustrated in FIG. 7B, the erosion processing is the processing for retrieving the minimum value in the region of the width of ±m having its center at the picture element of interest. The opening processing is equivalent to the processing in which the dilation processing is carried out after the erosion processing, i.e., the processing in which the maximum value is searched after the searching of the minimum value. Also, the closing processing is equivalent to the processing in which the erosion processing is carried out after the dilation processing, i.e., the processing in which the minimum value is searched after the searching of the maximum value.

More specifically, as illustrated in FIG. 7C, the opening processing is equivalent to the processing for smoothing the image density curve f(x) from the low luminance side, and removing a convex image density fluctuating portion (i.e., the portion at which the luminance is higher than that of the surrounding portions), which fluctuates in a region spatially narrower than the mask size of 2 m.

Also, as illustrated in FIG. 7D, the closing processing is equivalent to the processing for smoothing the image density curve f(x) from the high luminance side, and removing a concave image density fluctuating portion (i.e., the portion at which the luminance is lower than that of the surrounding portions), which fluctuates in the region spatially narrower than the mask size of 2 m.

In cases where the structure element g is not symmetric with respect to the origin, the dilation operation with Formula (3) is referred to as the Minkowski sum, and the erosion operation with Formula (4) is referred to as the Minkowski difference.

In cases where the image signal representing the image density value f(x) is a high image density-high signal level type of image signal, in which a high image density is represented by a high image signal level, the relationship between the image density value f(x) and the image signal value becomes reverse to the relationship between the image density value f(x) and the image signal value in the high luminance-high image signal level type of image signal. Therefore, the dilation processing, which is carried out on the high image density-high signal level type of image signal, coincides with the erosion processing, which is carried out on the high luminance-high signal level type of image signal as shown in FIG. 7B. The erosion processing, which is carried out on the high image density-high signal level type of image signal, coincides with the dilation processing, which is carried out on the high luminance-high signal level type of image signal as shown in FIG. 7A. The opening processing, which is carried out on the high image density-high signal level type of image signal, coincides with the closing processing, which is carried out on the high luminance-high signal level type of image signal as shown in FIG. 7D. Also, the closing processing, which is carried out on the high image density-high signal level type of image signal, coincides with the opening processing, which is carried out on the high luminance-high signal level type of image signal as shown in FIG. 7C.

The morphology processing is herein described with respect to the high luminance-high signal level type of image signal.

(Application to detection of calcified patterns)

In order for a calcified pattern to be detected, it is considered to employ a difference method, in which a smoothed image signal is subtracted from the original image signal. However, with a simple smoothing method, it is difficult to discriminate the calcified pattern from an elongated non-calcified pattern (for example, a pattern of the mammary gland, a blood vessel, mammary gland supporting tissues, or the like). Therefore, Obata of Tokyo University of Agriculture and Technology, et al. have proposed a morphology filter, which is represented by Formula (7) shown below and is based upon the opening operation using a multiply structure element. [Reference should be made to "Extraction of Small Calcified Patterns with A Morphology Filter Using A Multiply Structure Element," Collected Papers of The Institute of Electronics and Communication Engineers of Japan, D-II, Vol. J75-D-II, No. 7, pp. 1170–1176, July 1992; and "Fundamentals of Morphology and Its Application to Mammogram Processing," Medical Imaging Technology, Vol. 12, No. 1, January 1994.]

$$P = f - \max_{i\in(1,\cdots,M)}\{(f \ominus Bi) \oplus Bi\} \quad (7)$$
$$= f - \max_{i\in(1,\cdots,M)}\{f_{Bi}\}$$

In Formula (7), Bi (wherein i=1, 2, . . . , n) represents n number of linear structure elements, each of which has a size corresponding to the total size of m number of picture elements (in the example shown in FIG. 8, nine-picture element, four-direction structure elements are employed, and m=9, n=4). (The structure elements, as a whole, will hereinbelow be referred to as the m-picture element, n-direction multiply structure element.) In cases where the structure element Bi is set to be larger than the calcified pattern to be detected, a calcified pattern, which is a convex signal change portion finer than the structure element Bi (i.e., which is an image portion fluctuating in a spatially narrow region) and has luminance values larger than the luminance values of the surrounding portions, is removed in the opening processing. On the other hand, an elongated non-calcified pattern, such as a pattern of the mammary gland, is longer than the structure element Bi. Therefore, in cases where the inclination of the non-calcified pattern (i.e, the direction along which the non-calcified pattern extends) coincides with one of the directions of the four structure elements Bi, the non-calcified pattern remains unremoved after the opening processing, i.e. the operation of the second term of Formula (7), has been carried out. Therefore, when the smoothed image signal obtained from the opening processing (i.e. the signal representing the image, from which only the calcified pattern has been removed) is subtracted from the original image signal f, an image can be obtained which contains only the small calcified pattern. This is the concept behind Formula (7).

As described above, in cases where the image signal is of the high image density-high signal level type, the image density value of the calcified pattern is smaller than the image density values of the surrounding image portions, and the calcified pattern constitutes a concave signal change portion with respect to the surrounding portions. Therefore, the closing processing is applied in lieu of the opening processing, and Formula (8) shown below is applied in lieu of Formula (7).

$$P = f - \min_{i\in(1,\cdots,M)}\{(f \oplus Bi) \ominus Bi\} \quad (8)$$
$$= f - \min_{i\in(1,\cdots,M)}\{f^{Bi}\}$$

The closing processing carried out with Formula (8), which is an example of the morphology operation, will hereinbelow be described in detail.

Specifically, the morphology operation is carried out on the image density value Sorg, which is represented by the high image density-high signal level type of image signal. With the morphology operation, the maximum value processing (i.e., the dilation processing) is carried out on the image signal, which has a distribution of the image density value Sorg indicated by, for example, the solid line in FIG. 9A, by using a linear structure element B, which is constituted of three picture elements and is shown in FIG. 9B. As a result, an image density value $S_i$ of a certain picture element of interest is converted into $S_i'$, which takes the maximum value $S_{i+1}$ of the values of the three adjacent picture elements (determined by the structure element B) having their center at the picture element of interest. The operation is carried out for all of the picture elements constituting the image, each of them being taken as the picture element of interest. In this manner, the image signal having the distribution of the image density value Sorg indicated by the solid line in FIG. 9A is converted into the maximum value signal having the distribution of the image density value Sorg', which is indicated by the broken line in FIG. 9A.

Thereafter, the minimum value processing (i.e., the erosion processing) is carried out on the maximum value signal, which has been obtained from the maximum value processing, by using the structure element B. As a result, the maximum value signal $S_i'$ corresponding to the picture element of interest indicated by the broken line in FIG. 9A is converted into $S_i''$ (=$S_i$), which takes the minimum value $S_{i-1}''$ of the values of the three adjacent picture elements having their center at the picture element of interest. The operation is carried out for all of the picture elements constituting the image, each of them being taken as the picture element of interest. In this manner, the minimum value signal Sorg" having the distribution indicated by the chained line in FIG. 9A is obtained from the minimum value processing. The image signal indicated by the chained line in FIG. 9A has the distribution such that the image portion corresponding to the signal change portion, at which the original image signal Sorg fluctuates in a spatially narrower range than the size of the structure element B, has been eliminated, and such that the image portion corresponding to the signal change portion, at which the original image signal Sorg fluctuates in a spatially wider range than the size of the structure element B, and the image portion, at which the original image signal Sorg does not fluctuates, are kept in the original forms. More specifically, the aforesaid processing (i.e., the closing processing) serves as the processing for smoothing the image density distribution from the high image density side.

The value having been obtained from the closing processing (i.e., the value having been obtained by carrying out the maximum value processing on the original image signal Sorg and then carrying out the minimum value processing) is subtracted from the original image signal Sorg, and a value Smor is thereby obtained. The thus obtained value Smor represents the image portion corresponding to the signal change portion, at which the signal value fluctuates in a spatially narrower range than the size of the structure element B and which has been eliminated by the aforesaid closing operation.

Fundamentally, an image signal represents spatial coordinates (x, y), which constitute a two-dimensional element, and a signal value f(x, y), which constitutes a third dimensional element. However, in the foregoing, as an aid in facilitating the understanding, the morphology operation is described with respect to the one-dimensional image signal distribution curve, which appears in a predetermined cross section of the image expanded in the two-dimensional plane.

Therefore, actually, it is necessary for the foregoing explanation to be applied to a two-dimensional image. Also, for the processing of a two-dimensional image, the multiply structure element is employed.

In the morphology operation represented by Formula (7) or Formula (8), with which the specific image portion is extracted from the image represented by the original image signal, it is necessary for the operation to be carried out in two steps, such that the minimum value processing may firstly be carried out on the original image signal and the maximum value processing may then be carried out, or such that the maximum value processing may firstly be carried out on the original image signal and the minimum value processing may then be carried out. Specifically, for example, in the closing processing, the maximum value processing is firstly carried out on the original image signal, and information representing the results of the maximum value processing is stored. Thereafter, the minimum value processing is carried out on the results of the maximum value processing.

In cases where the original image is constituted of an array of Y lines×X picture elements (the total number of picture elements being Y×X picture elements) and the closing processing is carried out by using the m-picture element, n-direction multiply structure element, it is necessary for the aforesaid maximum value processing to be carried out with respect to every picture element of the original image. Also, it is necessary for the maximum value processing to be carried out for each of the n number of structure elements. Therefore, as the information representing the results of the maximum value processing, which information is to be stored, Y×X×n pieces of information are obtained. For example, in cases where the original image is constituted of an array of 1,024 lines×1,024 picture elements and the number n of the directions of the structure elements constituting the multiply structure element is equal to eight, a storage space for approximately 8,400,000 (=1,024×1,024×8) pieces of information must be prepared in order to store the information representing the results of the maximum value processing.

The results of the maximum value processing are the intermediate ones for obtaining the results of the closing processing. It is not practicable to use such a wide storage space for approximately 8,400,000 pieces of information for the storage of the information representing the intermediate results.

SUMMARY OF THE INVENTION

The primary object of the present invention is to provide a method of extracting an abnormal pattern, wherein a storage space for storing information representing intermediate results of closing processing or opening processing in a morphology operation is kept markedly small.

Another object of the present invention is to provide an apparatus for carrying out the method of extracting an abnormal pattern.

The objects are accomplished by a method and apparatus for extracting an abnormal pattern in accordance with the present invention, wherein minimum value processing (or maximum value processing) is carried out successively at the time at which the results of maximum value processing (or minimum value processing) serving as intermediate operation results of the closing processing (or the opening processing) in a morphology operation have been obtained in a number necessary for the minimum value processing (or the maximum value processing) to be carried out. The information representing the results of the maximum value processing (or the minimum value processing), which are necessary for only the already finished minimum value processing (or the already finished maximum value processing), is erased successively. Thereafter, information representing new results of maximum value processing (or minimum value processing) is stored in the free space, which is obtained from the erasing. The storage capacity necessary for storing the information representing the intermediate results is thereby kept markedly small.

Specifically, the present invention provides a first method of extracting an abnormal pattern, wherein maximum value processing and minimum value processing are carried out successively on an original image signal representing an original image, which is constituted of an array of Y lines×X picture elements, by using an m-picture element, n-direction multiply structure element, and an image portion corresponding to a signal change portion, at which the original image signal fluctuates in a spatially narrower range than the size of the multiply structure element, is thereby extracted from the original image, the method comprising the steps of:

(A) carrying out operations of (1) through (7) for each of n number of structure elements constituting the n-direction multiply structure element:
   (1) scanning the picture elements, which are located along a line in the array of the picture elements constituting the original image represented by the original image signal, one after another by using one of the structure elements,
   (2) each time a single picture element of the original image is thus scanned, extracting a maximum value signal, which represents the maximum value of the signal values of the original image signal corresponding to the picture elements overlapping upon the structure element, and storing the maximum value signal in an intermediate memory, which is constituted of a storage space of m lines×X picture elements, the maximum value signal being stored at a picture element on an m'th line in the intermediate memory, which picture element corresponds to the picture element of the original image that is being scanned, (3) after the scanning has been carried out for the single line in the array of the picture elements constituting the original image, shifting the maximum value signals, which have been stored along the m'th line in the intermediate memory, to an m−1'th line in the intermediate memory, (4) successively changing the line in the array of the picture elements constituting the original image, which line is scanned, and carrying out the operations of (2) and (3) defined above until maximum value signals are stored along an intermediate line in the intermediate memory, (5) changing the line in the array of the picture elements constituting the original image, which line is scanned, and carrying out the operation of (2) defined above, maximum value signals being thereby stored along the lines ranging from the m'th line to the intermediate line in the intermediate memory, (6) scanning the picture elements, which are located along the intermediate line in the intermediate memory and at which the maximum value signals have been stored, one after another by using the structure element, (7) each time a single picture element located along the intermediate line in the intermediate memory is thus scanned, extracting a minimum value signal, which represents the minimum value of the signal values of the maximum value signals stored at the picture elements overlapping upon the structure element, (B) selecting a minimum value signal, which takes the minimum value among n number of minimum value signals having been extracted with the operations of (A) defined above by using n number of the structure elements, (C) subtracting the selected minimum value signal from the signal value of the original image signal, which corresponds to the selected minimum value signal, and (D) repeating the operation for shifting the line in the intermediate memory, the operation for scanning the line in the array of the picture elements constituting the original image with the structure element, the operation for storing the maximum value signals along the m'th line in the intermediate memory, the operation for scanning the intermediate line in the intermediate memory, which operations are defined in (A) above, the operation for selecting the minimum value signal, which is defined in (B) above, and the operation for the subtraction, which is defined in (C) above, while the line in the array of the picture elements constituting the original image, which line is scanned, is being changed successively and up to the Y'th line.

The intermediate memory may be constituted in a flat plane-like form. Alternatively, the intermediate memory may be constituted in a ring-like form such that the first line and the m'th line may be adjacent to each other. In cases where the intermediate memory is constituted in the ring-like form, in lieu of the maximum value signals being stored along the m'th line in the intermediate memory in the operation defined in (2) above, the maximum value signals may be stored along the first line in the ring-like intermediate memory. Also, in lieu of the maximum value signals, which have been stored along the m'th line, being shifted to the m−1'th line in the operation defined in (3) above, the ring-like intermediate memory may be rotated by an angle corresponding to the width of a single line, and the maximum value signals may then be stored along the second line in the ring-like intermediate memory. In this manner, the maximum value signals may be stored successively along the subsequent lines. The ring-like intermediate memory may also be employed in a second method of extracting an abnormal pattern in accordance with the present invention, which will be described below.

The present invention also provides a second method of extracting an abnormal pattern, wherein maximum value processing and minimum value processing are carried out successively on an original image signal representing an original image, which is constituted of an array of Y lines×X picture elements, by using an m-picture element, n-direction multiply structure element, and an image portion corresponding to a signal change portion, at which the original image signal fluctuates in a spatially narrower range than the size of the multiply structure element, is thereby extracted from the original image, the method comprising the steps of:

(A) carrying out operations of (1) through (7) for each of n number of structure elements constituting the n-direction multiply structure element:

(1) scanning the picture elements, which are located along a line in the array of the picture elements constituting the original image represented by the original image signal, one after another by using one of the structure elements, (2) each time a single picture element of the original image is thus scanned, extracting a minimum value signal, which represents the minimum value of the signal values of the original image signal corresponding to the picture elements overlapping upon the structure element, and storing the minimum value signal in an intermediate memory, which is constituted of a storage space of m lines×X picture elements, the minimum value signal being stored at a picture element on an m'th line in the intermediate memory, which picture element corresponds to the picture element of the original image that is being scanned, (3) after the scanning has been carried out for the single line in the array of the picture elements constituting the original image, shifting the minimum value signals, which have been stored along the m'th line in the intermediate memory, to an m−1'th line in the intermediate memory, (4) successively changing the line in the array of the picture elements constituting the original image, which line is scanned, and carrying out the operations of (2) and (3) defined above until minimum value signals are stored along an intermediate line in the intermediate memory, (5) changing the line in the array of the picture elements constituting the original image, which line is scanned, and carrying out the operation of (2) defined above, minimum value signals being thereby stored along the lines ranging from the m'th line to the intermediate line in the intermediate memory, (6) scanning the picture elements, which are located along the intermediate line in the intermediate memory and at which the minimum value signals have been stored, one after another by using the structure element, (7) each time a single picture element located along the intermediate line in the intermediate memory is thus scanned, extracting a maximum value signal, which represents the maximum value of the signal values of the minimum value signals stored at the picture elements overlapping upon the structure element, (B) selecting a maximum value signal, which takes the maximum value among n number of maximum value signals having been extracted with the operations of (A) defined above by using n number of the structure elements, (C) subtracting the selected maximum value signal from the signal value of the original image signal, which corresponds to the selected maximum value signal, and (D) repeating the operation for shifting the line in the intermediate memory, the operation for scanning the line in the array of the picture elements constituting the original image with the structure element, the operation for storing the minimum value signals along the m'th line in the intermediate memory, the operation for scanning the intermediate line in the intermediate memory, which operations are defined in (A) above, the operation for selecting the maximum value signal, which is defined in (B) above, and the operation for the subtraction, which is defined in (C) above, while the line in the array of the picture elements constituting the original image, which line is scanned, is being changed successively and up to the Y'th line.

The present invention further provides a first apparatus for extracting an abnormal pattern, wherein maximum value processing and minimum value processing are carried out successively on an original image signal representing an original image, which is constituted of an array of Y lines×X picture elements, by using an m-picture element, n-direction multiply structure element, and an image portion corresponding to a signal change portion, at which the original image signal fluctuates in a spatially narrower range than the size of the multiply structure element, is thereby extracted from the original image, the apparatus comprising:

i) n number of maximum value signal extracting means, each of the maximum value signal extracting means scanning the picture elements, which are located along a line in the array of the picture elements constituting the original image represented by the original image signal, one after another with one of n number of structure elements, which constitute the n-direction multiply structure element, and extracting a maximum value signal, which represents the maximum value of the signal values of the original image signal corresponding to the picture elements overlapping upon the structure element, each time a single picture element of the original image is thus scanned, ii) n number of intermediate memories, each of which is constituted of a storage space of m lines×Xpicture elements, the intermediate memories storing maximum value signals, which have been extracted with n number of the structure elements by n number of the maximum value signal extracting means, at corresponding picture elements in the intermediate memories, iii) shifting means for shifting the maximum value signals, which have been stored along an i'th line, where i=2, 3, . . . , m, in each of the intermediate memories, to an i−1'th line in the intermediate memory, iv) n number of minimum value signal extracting means, each of the minimum value signal extracting means operating with respect to one of the intermediate memories, in which the maximum value signals have been stored along lines up to at least an intermediate line among all lines, each of the minimum value signal extracting means scanning the picture elements, which are located along a line in the intermediate memory and at which the maximum value signals have been stored, one after another by using the corresponding structure element, and extracting a minimum value signal, which represents the minimum value of the signal values of the maximum value signals stored at the picture elements overlapping upon the corresponding structure element, each time a single picture element located along the line in the intermediate memory is thus scanned, v) a minimum value selecting means for selecting a minimum value signal, which takes the minimum value among n number of minimum value signals having been extracted by n number of the minimum value signal extracting means, and vi) a subtraction means for subtracting the minimum value signal, which has been selected by the minimum value selecting means, from the signal value of the original image signal, which corresponds to the selected minimum value signal.

In the first apparatus for extracting an abnormal pattern in accordance with the present invention and a second apparatus for extracting an abnormal pattern in accordance with the present invention, which will be described below, each of the intermediate memories may be constituted in a flat plane-like form. Alternatively, each of the intermediate memories may be constituted in a ring-like form such that the first line and the m'th line may be adjacent to each other. In cases where each of the intermediate memories is constituted in the ring-like form, the maximum value signals may be stored successively along the first line, the second line, the third line, and so on. In this manner, the maximum value signals may be stored successively along the subsequent lines. Also, in lieu of the shifting means, a rotation means for successively rotating the ring-like intermediate memory by an angle corresponding to the width of a single line and in a forward direction may be employed.

The present invention still further provides a second apparatus for extracting an abnormal pattern, wherein maximum value processing and minimum value processing are carried out successively on an original image signal representing an original image, which is constituted of an array of Y lines×X picture elements, by using an m-picture element, n-direction multiply structure element, and an image portion corresponding to a signal change portion, at which the original image signal fluctuates in a spatially narrower range than the size of the multiply structure element, is thereby extracted from the original image, the apparatus comprising:

i) n number of minimum value signal extracting means, each of the minimum value signal extracting means scanning the picture elements, which are located along a line in the array of the picture elements constituting the original image represented by the original image signal, one after another with one of n number of structure elements, which constitute the n-direction multiply structure element, and extracting a minimum value signal, which represents the minimum value of the signal values of the original image signal corresponding to the picture elements overlapping upon the structure element, each time a single picture element of the original image is thus scanned, ii) n number of intermediate memories, each of which is constituted of a storage space of m lines×X picture elements, the intermediate memories storing minimum value signals, which have been extracted with n number of the structure elements by n number of the minimum value signal extracting means, at corresponding picture elements in the intermediate memories, iii) shifting means for shifting the minimum value signals, which have been stored along an i'th line, where i=2, 3, ..., m, in each of the intermediate memories, to an i−1'th line in the intermediate memory, iv) n number of maximum value signal extracting means, each of the maximum value signal extracting means operating with respect to one of the intermediate memories, in which the minimum value signals have been stored along lines up to at least an intermediate line among all lines, each of the maximum value signal extracting means scanning the picture elements, which are located along a line in the intermediate memory and at which the minimum value signals have been stored, one after another by using the corresponding structure element, and extracting a maximum value signal, which represents the maximum value of the signal values of the minimum value signals stored at the picture elements overlapping upon the corresponding structure element, each time a single picture element located along the line in the intermediate memory is thus scanned, v) a maximum value selecting means for selecting a maximum value signal, which takes the maximum value among n number of maximum value signals having been extracted by n number of the maximum value signal extracting means, and vi) a subtraction means for subtracting the maximum value signal, which has been selected by the maximum value selecting means, from the signal value of the original image signal, which corresponds to the selected maximum value signal.

With the method and apparatus for extracting an abnormal pattern in accordance with the present invention, the minimum value processing (or the maximum value processing) is carried out successively at the time at which the results of the maximum value processing (or the minimum value processing) serving as intermediate operation results of the closing processing (or the opening processing) in the morphology operation have been obtained in a number necessary for the minimum value processing (or the maximum value processing) to be carried out. The information representing the results of the maximum value processing (or the minimum value processing), which are necessary for only the already finished minimum value processing (or the already finished maximum value processing), can be erased successively. Thereafter, information representing new results of maximum value processing (or minimum value processing) can be stored in the free space, which is obtained from the erasing. Therefore, the storage capacity necessary for storing the information representing the intermediate results can be kept markedly small.

BRIEF DESCRIPTION OF THE DRAWINGS

FIG. 4 is an explanatory view showing how a structure element scans an original image signal.

DESCRIPTION OF THE PREFERRED EMBODIMENTS

The present invention will hereinbelow be described in further detail with reference to the accompanying drawings.

Figure 1:
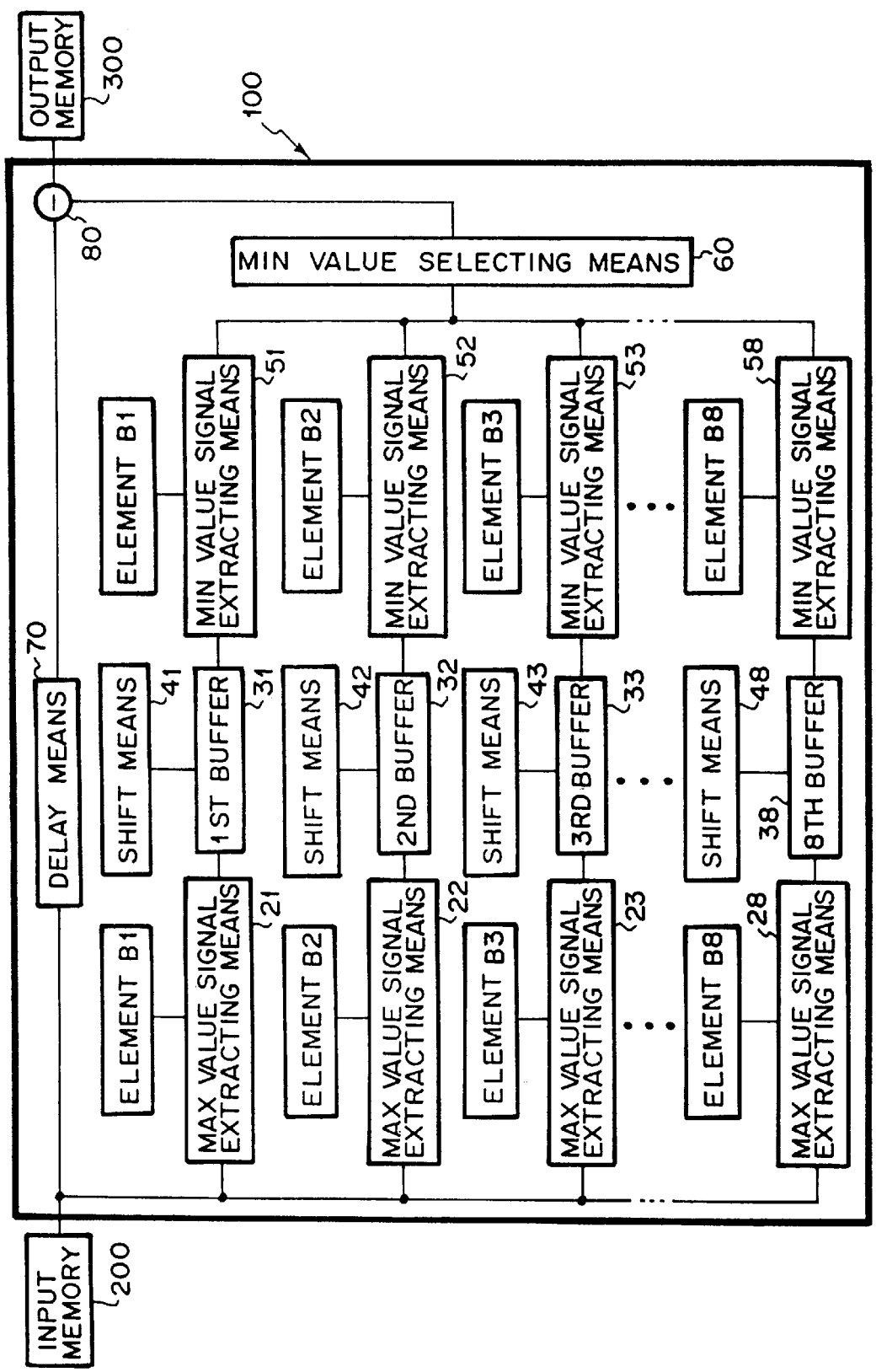
FIG. 1 is a block diagram showing a small calcified pattern extracting apparatus, in which an embodiment of the first apparatus for extracting an abnormal pattern in accordance with the present invention is employed.

FIG. 1 is a block diagram showing a small calcified pattern extracting apparatus 100, in which an embodiment of the first apparatus for extracting an abnormal pattern in accordance with the present invention is employed.

Figure 2:
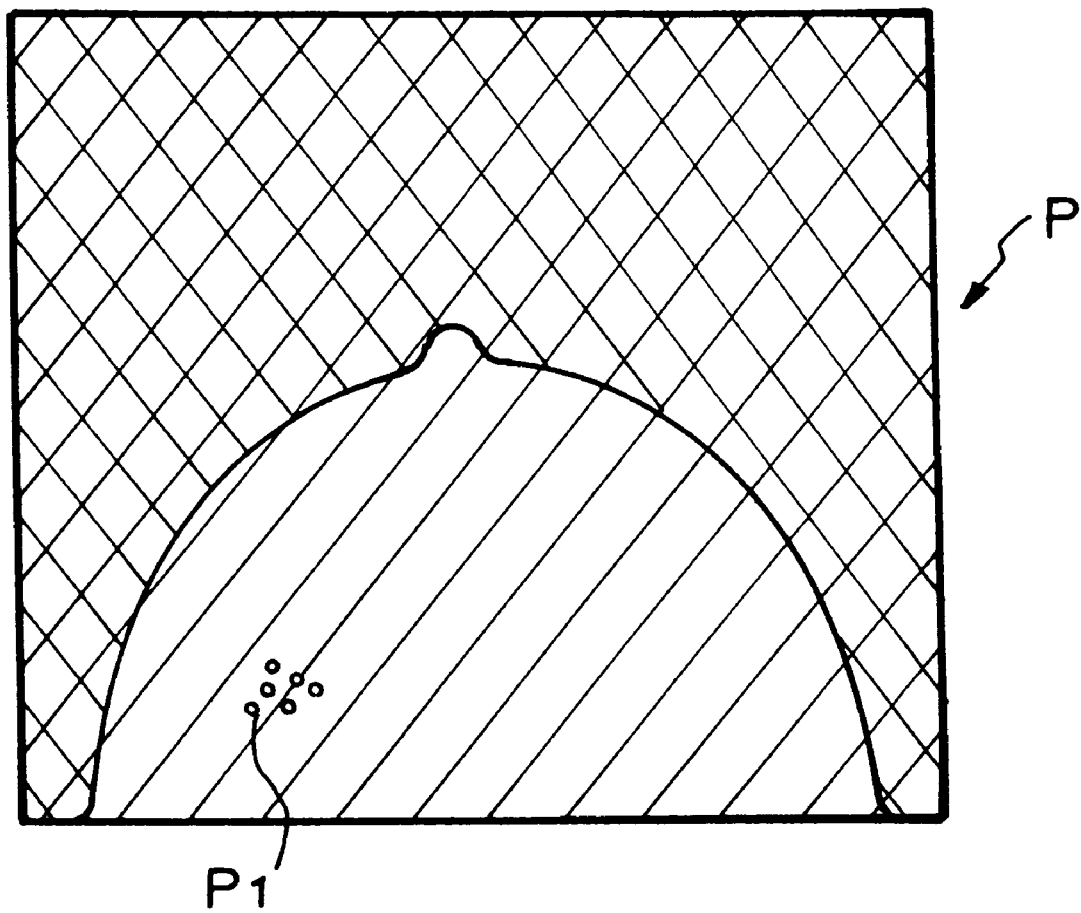
FIG. 2 is an explanatory view showing a mammogram, which is subjected to processing in the embodiment of FIG. 1, FIGS. 3A through 3H are explanatory views showing eight structure elements constituting a multiply structure element, which is utilized in the embodiment of FIG. 1.

An original image signal Sorg, which is processed in the small calcified pattern extracting apparatus 100 of FIG. 1, is obtained by reading out a radiation image of the mamma (i.e., a mammogram) P, which is illustrated in FIG. 2, as an array of 1,024 lines (rows)×1,024 picture elements (columns). The original image signal Sorg is stored previously in an input memory 200.

The original image signal Sorg contains a small calcified pattern signal S1 representing a small calcified pattern P1, which is one of characteristic forms of mammary cancers. In cases where the entire area of the image is read out as an array of 1,024 lines (rows)×1,024 picture elements (columns), the small calcified pattern P1 is detected as a circular pattern having a diameter approximately equal to the total length of six picture elements.

As illustrated in FIGS. 3A through 3H, the small calcified pattern extracting apparatus 100 is provided with a multiply structure element, which is constituted of eight structure elements $B_k$, where k=1, 2, ..., 8. Each of the structure elements $B_k$ is composed of seven picture elements, which are arrayed linearly, and has a size slightly larger than the size (=six picture elements) of the small calcified pattern P1, which is to be extracted. The eight structure elements $B_k$ extend along eight directions of inclinations varying by 22.5 degrees. The small calcified pattern extracting apparatus 100 has the constitution described below for each of the structure elements Bk.

Figure 3D:
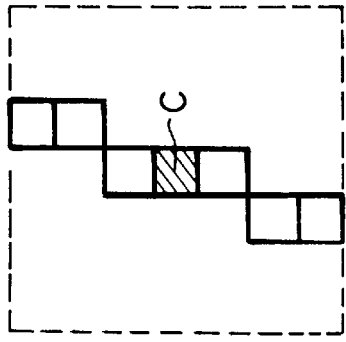
Figure 3C:
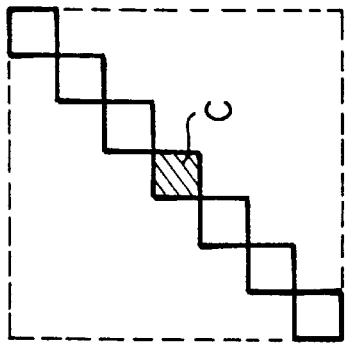
Figure 3B:
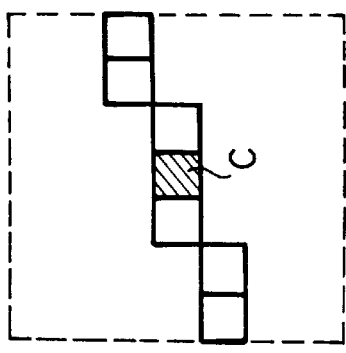
Figure 3A:
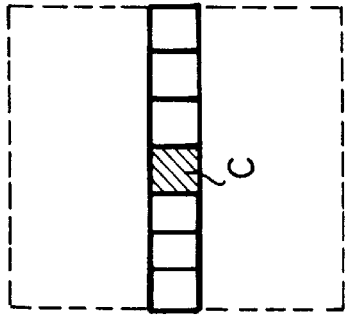
Figure 3H:
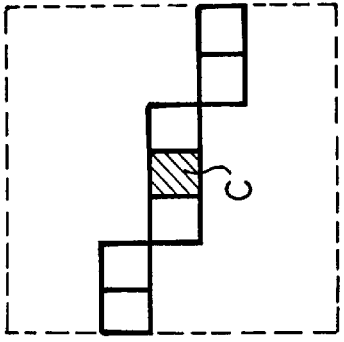
Figure 3G:
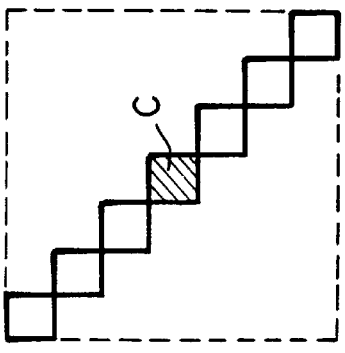
Figure 3F:
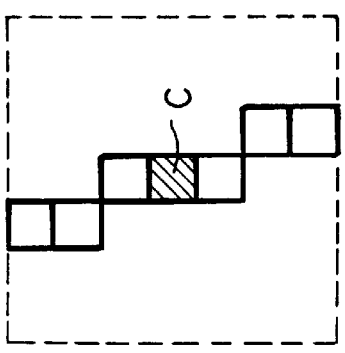
Figure 3E:
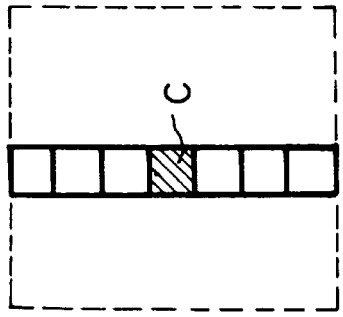

As an aid in facilitating the explanation, the constitution for a structure element B3, which is shown in FIG. 3C, will be described hereinbelow.

Specifically, for the structure element B3, the small calcified pattern extracting apparatus 100 is provided with a maximum value signal extracting means 23, a buffer memory 33, a shifting means 43 and a minimum value signal extracting means 53. The maximum value signal extracting means 23 scans the picture elements, which are located along each line in the array of the picture elements constituting the original image represented by the original image signal Sorg, one after another by using the structure element B3. Each time a single picture element of the original image is thus scanned, the maximum value signal extracting means 23 extracts an image signal (a maximum value signal) Smax representing a picture element, which takes the maximum signal value among the seven picture elements of the original image overlapping upon the structure element B3. The buffer memory 33 is constituted of a storage space of 7 lines×1,024 picture elements. The buffer memory 33 stores the maximum value signal Smax, which has been extracted by the maximum value signal extracting means 23, at a corresponding picture element on a seventh line in the buffer memory 33. The shifting means 43 shifts the maximum value signals Smax, which have been stored along an i'th line, where i=2, 3, . . . , 7, in the buffer memory 33, back to an i−1'th line in the buffer memory 33. From the time at which the maximum value signals Smax have been stored along lines up to a fourth line that is an intermediate line in the buffer memory 33, the minimum value signal extracting means 53 scans the picture elements, which are located along the fourth line in the buffer memory 33 (corresponding to the first line in the array of the picture elements of the original image) and at which the maximum value signals Smax have been stored, one after another by using the corresponding structure element B3. Each time a single picture element located along the fourth line in the buffer memory 33 is thus scanned, the minimum value signal extracting means 53 extracts a minimum value signal Smin, which represents the minimum value of the signal values of the maximum value signals Smax stored at the picture elements in the buffer memory 33 that overlap upon the structure element B3.

Also, for structure elements B1, B2, B4, B5, B6, B7, and B8, respectively, the small calcified pattern extracting apparatus 100 is provided with maximum value signal extracting means 21, 22, 24, 25, 26, 27, and 28, which operate in the same manner as that in the maximum value signal extracting means 23. Further, the small calcified pattern extracting apparatus 100 is provided with buffer memories 31, 32, 34, 35, 36, 37, and 38, which operate in the same manner as that in the buffer memory 33. The small calcified pattern extracting apparatus 100 is still further provided with shifting means 41, 42, 44, 45, 46, 47, and 48, which operate in the same manner as that in the shifting means 43, and minimum value signal extracting means 51, 52, 54, 55, 56, 57, and 58, which operate in the same manner as that in the minimum value signal extracting means 53.

Further, the small calcified pattern extracting apparatus 100 is provided with a minimum value selecting means 60, a delay means 70, and a subtracter 80. The minimum value selecting means 60 selects a minimum value signal min(Smin), which takes the minimum value among the minimum value signals Smin having been extracted by the minimum value signal extracting means 51 through 58 and corresponding to each picture element that is being scanned. The delay means 70 delays the output of the signal value of the original image signal Sorg received from the input memory 200, which signal value represents the scanned picture element corresponding to the minimum value signal min(Smin) fed out from the minimum value selecting means 60, by a length of time corresponding to four lines. Also, the subtracter 80 subtracts the minimum value signal 33 min (Smin), which is received from the minimum value selecting means 60, from the signal value of the original image signal Sorg received from the delay means 70, which signal value represents the scanned picture element corresponding to the minimum value signal min(Smin).

As described above, from the time at which the scanning of the original image by each of the maximum value signal extracting means 21 through 28 has been completed for four lines in the array of the picture elements of the original image, the scanning of the fourth line in each of the buffer memories 31 through 38 (corresponding to the first line in the array of the picture elements of the original image) is begun by each of the minimum value signal extracting means 51 through 58. Therefore, such that the output of the minimum value selecting means 60 and the signal value of the original image signal Sorg, which represents the picture element corresponding to the output of the minimum value selecting means 60, may be subtracted from each other in the subtracter 80, the delay means 70 delays the output of the signal value of the original image signal Sorg, which signal value represents the picture element that is scanned by each of the maximum value signal extracting means 21 through 28, by a length of time corresponding to four lines.

After the maximum value signals Smax have been shifted to the first line in each of the buffer memories 31 through 38, the maximum value signals Smax, which are stored along the second line, are shifted to the first line by each of the shifting means 41 through 48 and overwritten upon the first line. In this manner, the maximum value signals Smax, which were stored previously along the first line, are erased.

How the small calcified pattern extracting apparatus 100 operates will hereinbelow be described with respect to the structure element B3. (Operations with respect to the other structure elements proceed simultaneously in synchronization with the operation for the structure element B3, which will be described below.)

0) The original image signal Sorg is fed from the input memory 200 into the delay means 70 and the maximum value signal extracting means 21 through 28.

1) As illustrated in FIG. 4, the maximum value signal extracting means 23 sets the structure element B3 such that its middle picture element C may coincide with the first line in the array of 1,024 lines (rows)×1,024 picture elements (columns) of the original image represented by the original image signal Sorg, which has been received from the input memory 200. In this manner, the maximum value signal extracting means 23 scans the picture elements of the original image, which are located along the first line, one after another with the structure element B3.

2) Each time a single picture element of the original image is thus scanned, the maximum value signal extracting means 23 extracts the maximum value signal representing a picture element, which takes the maximum signal value among the picture elements of the original image overlapping upon the structure element B3. The maximum value signal is stored at the first picture element on the seventh line in the buffer memory 33.

At the time at which the first picture element on the first line in the array of the picture elements of the original image is scanned with the structure element B3, which is indicated by the solid line in FIG. 4, only the middle picture element C of the structure element B3 and the first picture element on the first line in the array of the picture elements of the original image, S(1,1), overlap one upon the other. [An x'th picture element on a y'th line in the array of the picture elements of the original image will hereinbelow be represented by S(x,y). Also, as an aid in facilitating the explanation, the original image signal representing the picture element S(x,y) will also be represented by S(x,y).] Therefore, at this time, the image signal S(1,1) representing the first picture element on the first line in the array of the picture elements of the original image, S(1,1), is stored at the first picture element on the seventh line in the buffer memory 33.

At each picture element on each line in the buffer memory 33, the maximum value of the dynamic range of the original image signal (for example, 255 for 8-bit images or 1,023 for 10-bit images) is stored as a default value. (The problems are thereby prevented from occurring in that a portion, at which no signal value is stored, occurs during the operation for scanning the information stored in the buffer memory 33 with the structure element B3 and extracting the minimum value signals.)

Figure 5:
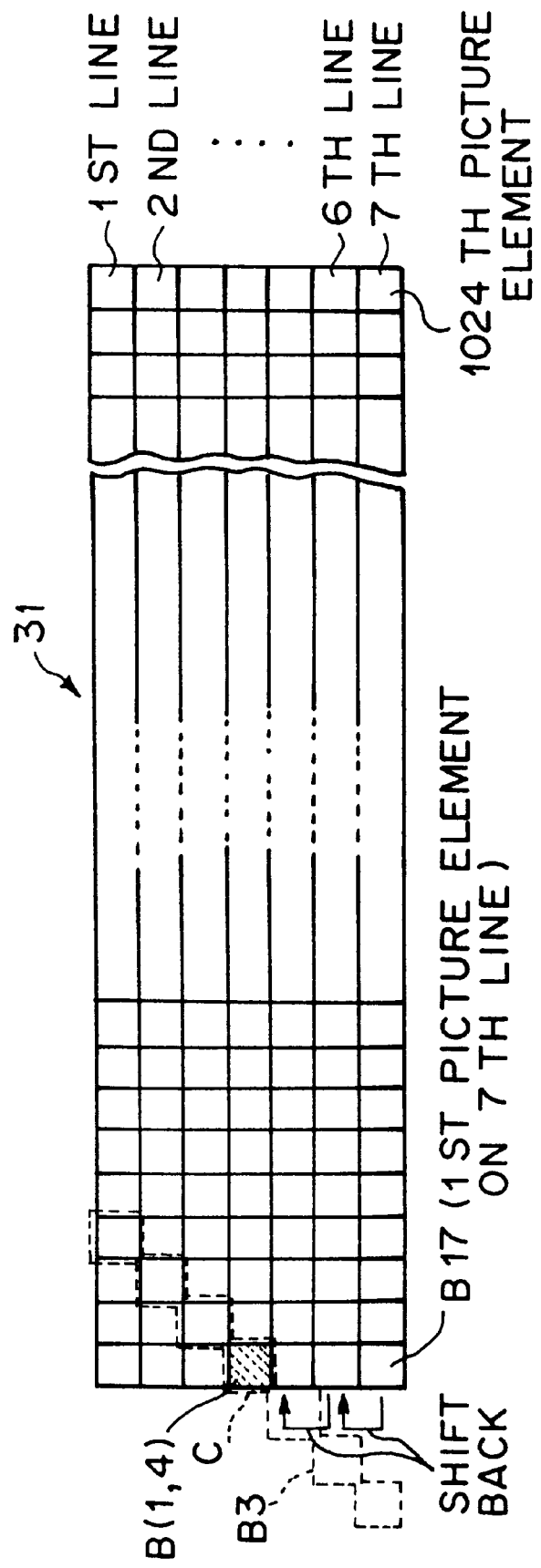
FIG. 5 is an explanatory view showing how a structure element scans information stored in a buffer memory and how the stored information is shifted back in the buffer memory.

3) When the scanning along the first line in the array of the picture elements of the original image carried out by the maximum value signal extracting means 23 is finished, the maximum value signals corresponding to the picture elements located along the first line in the original image, which picture elements are scanned by the maximum value signal extracting means 23, are stored at the corresponding picture elements on the seventh line in the buffer memory 33. As illustrated in FIG. 5, the buffer memory 33 has the storage space of 7 lines×1,024 picture elements. [An x'th picture element on a y'th line in the buffer memory 33 will herein below be represented by B(x,y). For example, a picture element B(1,7) in the buffer memory 33 represents the first picture element on the seventh line.]

4) The shifting means 43 shifts the maximum value signals, which have been stored at picture elements B(x,7) on the seventh line in the buffer memory 33, back to picture elements B(x,6) on the sixth line in the buffer memory 33. (The seventh line becomes empty.)

5) Thereafter, the maximum value signal extracting means 23 sets the structure element B3 such that its middle picture element C may coincide with the second line in the array of the picture elements of the original image. In this manner, the maximum value signal extracting means 23 scans the picture elements of the original image, which are located along the second line, one after another with the structure element B3. Also, the same operations as those described in (2), (3), and (4) above are carried out.

The maximum value signals, which have been extracted by the maximum value signal extracting means 23, are always stored at the picture elements B(x,7) on the seventh line in the buffer memory 33.

6) The operations described above are repeated, and the maximum value signals are shifted from the picture elements B(x,5) on the fifth line in the buffer memory 33 back to the picture elements B(x,4) on the fourth line in the buffer memory 33. In this manner, the maximum value signals are stored at the picture elements B(x,4) on the fourth line in the buffer memory 33. Thereafter, the maximum value signal extracting means 23 begins the scanning along the fourth line in the array of the picture elements of the original image, and the same operations as those described in (2) and (3) above are carried out. In this manner, the maximum value signals are stored along the seventh line in the buffer memory 33. As a result, the maximum value signals are stored in the storage space ranging from the picture elements B(x,4) on the fourth line to the picture elements B(x,7) on the seventh line in the buffer memory 33.

As described above, the default values of 1,023 have been stored in the storage space ranging from the picture elements B(x,1) on the first line to the picture elements B(x,3) on the third line in the buffer memory 33.

7) As illustrated in FIG. 5, the minimum value signal extracting means 53 sets the structure element B3 such that its middle picture element C may coincide with the first picture element among the picture elements B(x,4) on the fourth line in the buffer memory 33. In this manner, the minimum value signal extracting means 53 scans the picture elements B(x,4) on the fourth line in the buffer memory 33 one after another with the structure element B3.

8) When the first picture element B(1,4) on the fourth line in the buffer memory 33 is scanned, the minimum value signal extracting means 53 extracts the minimum value signal corresponding to a picture element, which takes the minimum signal value among the picture elements in the buffer memory 33 overlapping upon the structure element B3. The extracted minimum value signal is fed into the minimum value selecting means 60.

The minimum value signal, which is fed into the minimum value selecting means 60, is the one which has been obtained by carrying out the maximum value processing with the structure element B3 on the original image signal Sorg and thereafter carrying out the minimum value processing with the structure element B3 on the signal having been obtained from the maximum value processing. Specifically, the minimum value signal, which is fed into the minimum value selecting means 60, is a morphology signal Smor3, which is obtained by carrying out the closing processing with the structure element B3 on the original image signal Sorg.

9) The operations described in (1) through (8) above proceed simultaneously also for the other structure elements. Therefore, eight minimum value signals are fed into the minimum value selecting means 60. The minimum value selecting means 60 selects the minimum value signal, which takes the minimum signal value among the eight minimum value signals. The selected minimum value signal is fed into the subtracter 80.

The minimum value signal, which has been selected by the minimum value selecting means 60, represents the second term of Formula (8) shown below.

$$P = f - \min_{i \in (1, \cdots, M)} \{(f \oplus Bi) \ominus Bi\} \quad (8)$$

$$= f - \min_{i \in (1, \cdots, M)} \{f^{Bi}\}$$

10) The subtracter 80 subtracts the minimum value signal, which has been received from the minimum value selecting means 60 in the operation described in (9) above, from the signal value S(1,1) of the original image signal, which represents the first picture element on the first line in the array of the picture elements of the original image and has been received with the delayed timing from the delay means 70. The information representing the results of the subtraction is fed into an output memory 300.

11) In this manner, the information S' (1,1) representing the results of the processing carried out with Formula (9) shown below, which are obtained when the first picture element S(1,1) on the first line in the array of the picture elements of the original image is scanned with the structure elements Bk, where k=1, 2, . . . , 8, is stored in the output memory 300.

$$S' = Sorg - \min_{i \in I, \cdots, 8} \{(Sorg \oplus Bi) \ominus Bi\} \quad (9)$$

Formula (9) has the same meaning as that of Formula (8) shown above.

12) Each time the picture element B(x,4) on the fourth line in the buffer memory 33 is scanned by the minimum value signal extracting means 53, the operations described in (8), (9), (10), and (11) above are repeated. (The minimum value signal extracting means 53 always scan along the fourth line in the buffer memory 33.) In this manner, the pieces of information, S'(1,1) through S'(1024,1), representing the results of the processing carried out with Formula (9) shown above, which results are obtained when the first picture element S(1,1) through 1024th picture element S(1024,1) on the first line in the array of the picture elements of the original image are scanned with the structure elements Bk, where k=1, 2, . . . , 8, are stored in the output memory 300.

13) Thereafter, the shifting means 43 shifts the maximum value signals, which are stored at the picture elements B(x,y) on each line in the buffer memory 33, back by a single line. Also, the maximum value signal extracting means 23 sets the structure element B3 such that its middle picture element C may coincide with the fifth line in the array of the picture elements of the original image. In this manner, the maximum value signal extracting means 23 scans the picture elements of the original image, which are located along the fifth line, one after another with the structure element B3. Further, the same operations as those up to (12) described above are carried out.

14) The operations described above are repeated until the maximum value signal extracting means 23 scans the 1024th picture element on the 1024th line in the array of the picture elements of the original image. In this manner, the pieces of information, S'(1,1) through S'(1024,1024), which represent the results of the processing carried out with Formula (9) shown above and correspond to the first picture element on the first line through 1024th picture element on the 1024th line in the array of the picture elements of the original image, are stored in the output memory 300.

With the operations described above, an image signal (i.e., an abnormal pattern image signal) S' represented by Formula (9) shown above can be extracted accurately from the original image signal Sorg. The image signal S' represents an image portion, which extends in a direction that does not coincide with the directions of the structure elements Bi, which has a size smaller than the sizes of the structure elements Bi, and which has an image density value (represented by the original image signal Sorg) that is smaller than the image density values of the surrounding areas. Specifically, the image signal S' represents the small calcified pattern P1 in a mammary cancer.

Also, with this embodiment of the apparatus for extracting an abnormal pattern, as the storage space for storing the outputs (i.e., the maximum value signals) of the maximum value signal extracting means 21 through 28, which outputs are the results of the intermediate processing in the morphology operation, only the small storage space for approximately 57,000 picture elements (=7 lines×1,024 picture elements×8 structure elements) may be prepared. Thus the storage space can be kept markedly smaller than the storage space for approximately 8,400,000 picture elements (=1,024 lines×1,024 picture elements×8 directions), which was required in the past.

Figure 6:
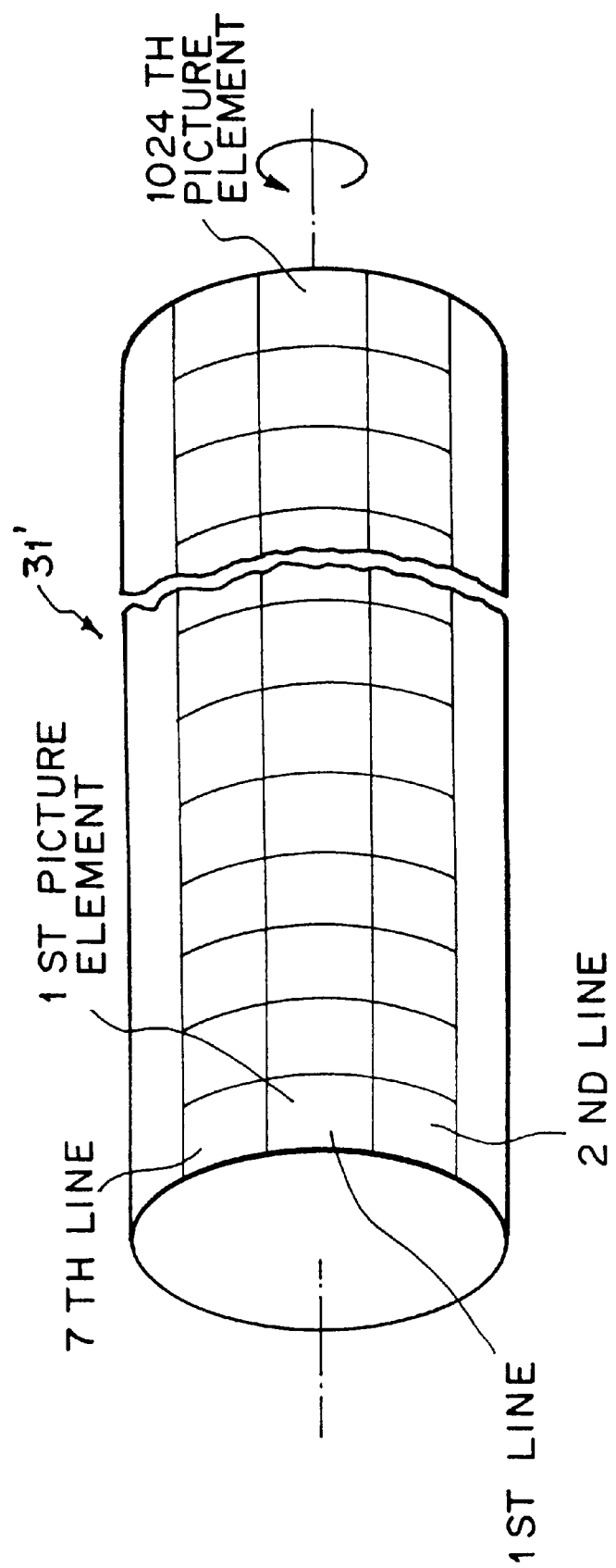
FIG. 6 is an explanatory view showing a ring line buffer memory.
Figure 7A:
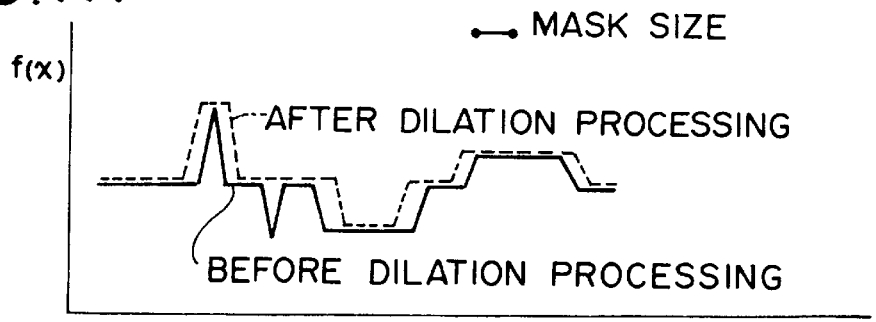
FIG. 7A is a graph showing how a dilation processing, which is one of fundamental morphology operations, is carried out.
Figure 7B:
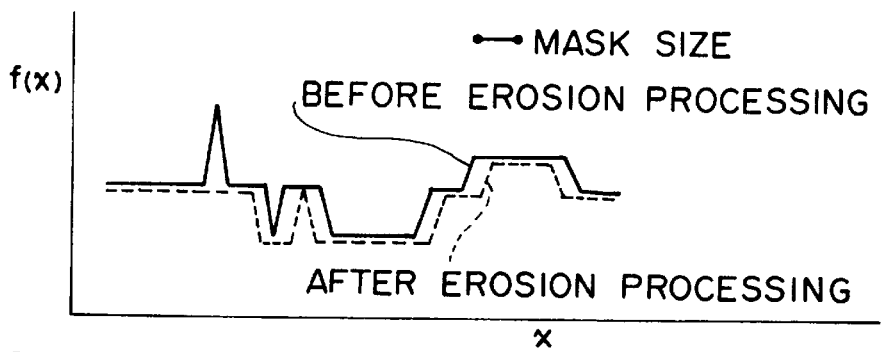
FIG. 7B is a graph showing how an erosion processing, which is one of fundamental morphology operations, is carried out.
Figure 7C:
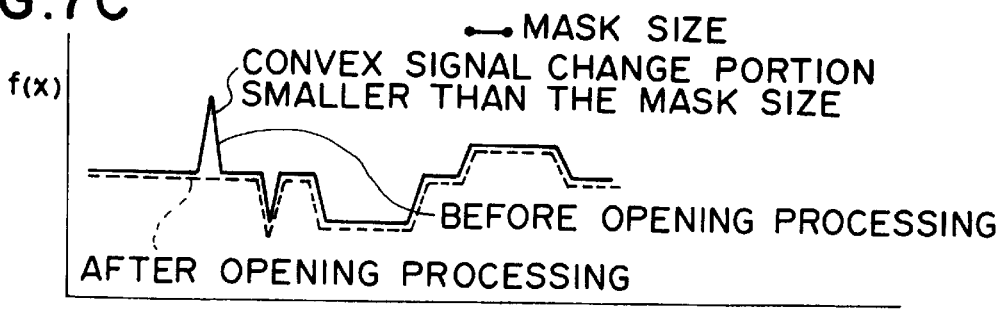
FIG. 7C is a graph showing how an opening processing, which is one of fundamental morphology operations, is carried out.
Figure 7D:
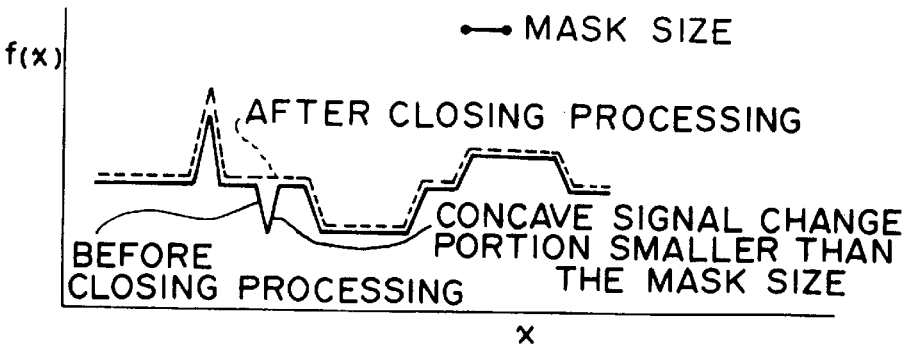
FIG. 7D is a graph showing how a closing processing, which is one of fundamental morphology operations, is carried out.
Figure 8:
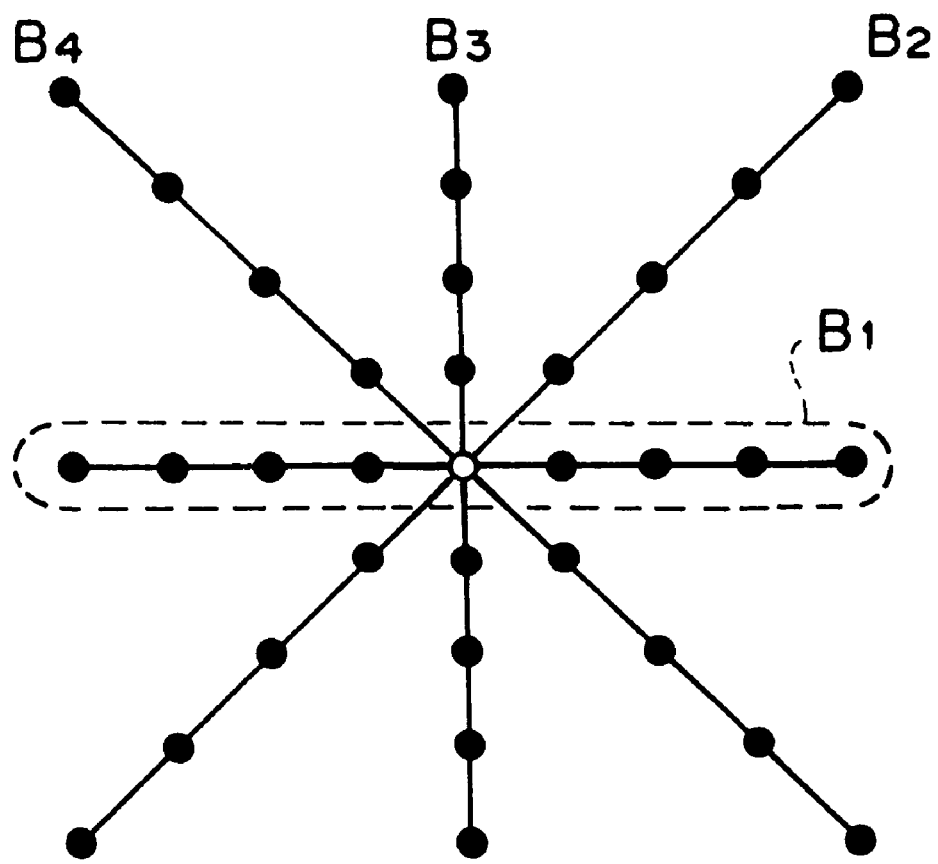
FIG. 8 is an explanatory view showing structure elements $B_i$ (where i=1, 2, ..., M; M=4) employed in a morphology filter.
Figure 9A:
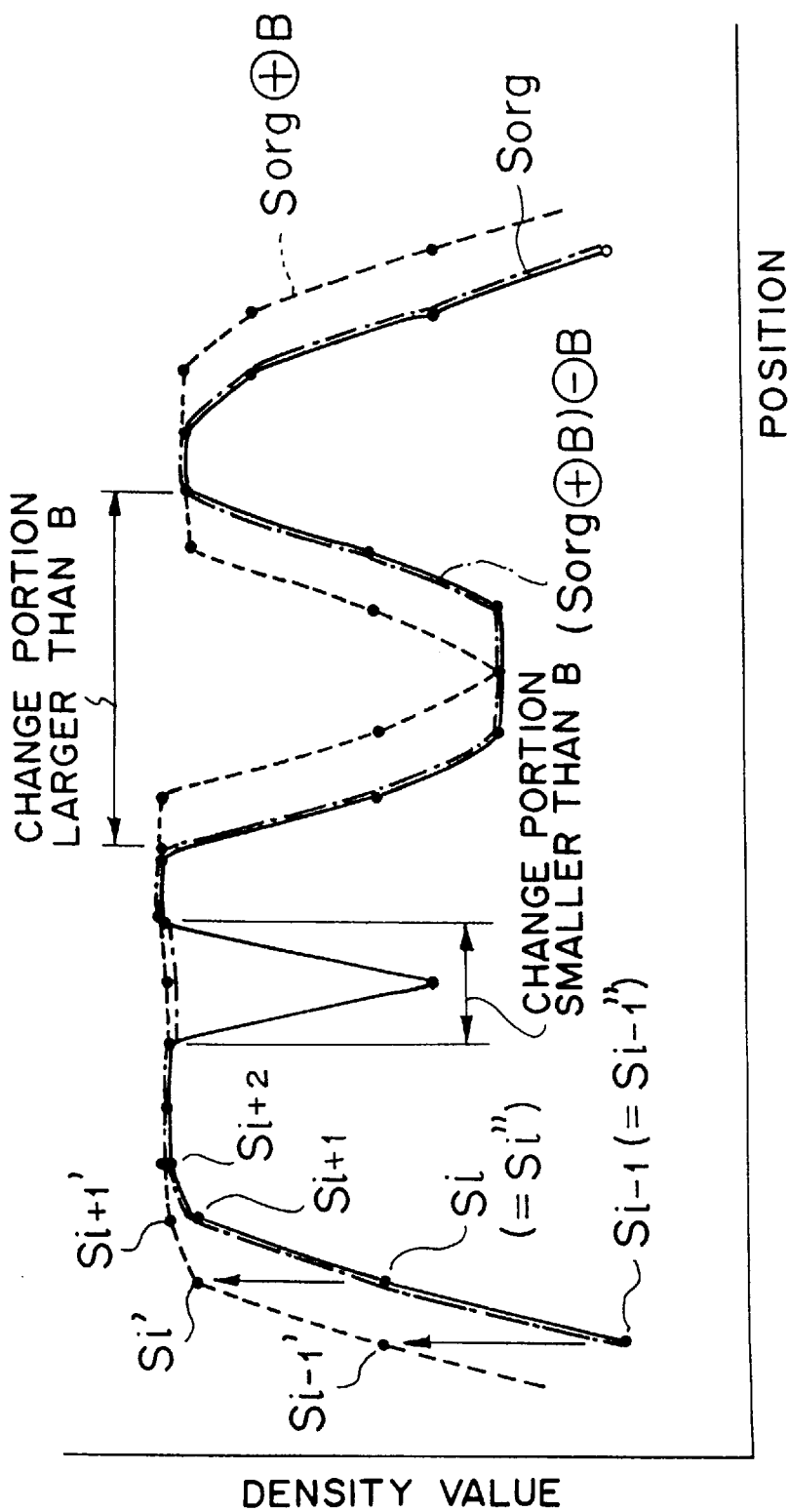
FIG. 9A is a graph showing a distribution of image density values, the graph serving as an aid in explaining how the processing with morphology operation is carried out.
Figure 9B:
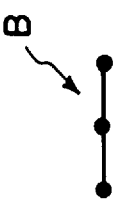
FIG. 9B is an explanatory view showing a linear structure element B, which is constituted of three picture elements.

In the embodiment described above, as illustrated in FIG. 5, each of the buffer memories 31 through 38 is constituted in a flat plane-like form. Alternatively, as illustrated in FIG. 6, ring line buffer memories 31' through 38' may be employed, each of which is constituted in a ring-like form such that the first line and the seventh line may be adjacent to each other. In such cases, in lieu of the maximum value signals, which have been stored along each line, being shifted back, each of the ring line buffer memories 31' through 38' may be rotated by an angle corresponding to the width of a single line and in the direction indicated by the arrow in FIG. 6. Therefore, the time required to shift the information, which has been stored in each buffer memory, to different lines can be eliminated, and the time required to carry out the processing can be kept short.

Further, in the embodiment described above, the closing processing, in which the maximum value processing is firstly carried out and thereafter the minimum value processing is carried out, is employed. Alternatively, in an embodiment of the second apparatus for extracting an abnormal pattern in accordance with the present invention, the opening processing, in which the minimum value processing is firstly carried out and thereafter the maximum value processing is carried out, may be employed. In such cases, an image signal (i.e., an abnormal pattern image signal) S' represented by Formula (10) shown below can be extracted accurately from the original image signal Sorg. The image signal S' represents an image portion, which extends in a direction that does not coincide with the directions of the structure elements Bi, which has a size smaller than the sizes of the structure elements Bi, and which has a luminance value (represented by the original image signal Sorg) that is smaller than the luminance values of the surrounding areas.

$$S' = Sorg - \max_{i \in I, \cdots, 8} \{(Sorg \ominus Bi) \oplus Bi\} \quad (10)$$

Formula (10) shown above has the same meaning as that of Formula (7) shown above.

What is claimed is:

1. A method of extracting an abnormal pattern, wherein maximum value processing and minimum value processing are carried out successively on an original image signal representing an original image, which is constituted of an array of Y lines×X picture elements, by using an m-picture element, n-direction multiply structure element, and an image portion corresponding to a signal change portion, at which the original image signal fluctuates in a spatially narrower range than the size of the multiply structure element, is thereby extracted from the original image, the method comprising the steps of:

(A) carrying out operations of (1) through (7) for each of n number of structure elements constituting the n-direction multiply structure element:

(1) scanning the picture elements, which are located along a line in the array of the picture elements constituting the original image represented by the original image signal, one after another by using one of the structure elements, (2) each time a single picture element of the original image is thus scanned, extracting a maximum value signal, which represents the maximum value of the signal values of the original image signal corresponding to the picture elements overlapping upon said structure element, and storing said maximum value signal in an intermediate memory, which is constituted of a storage space of m lines×X picture elements, said maximum value signal being stored at a picture element on an m'th line in said intermediate memory, which picture element corresponds to the picture element of the original image that is being scanned, (3) after the scanning has been carried out for said single line in the array of the picture elements constituting the original image, shifting the maximum value signals, which have been stored along the m'th line in said intermediate memory, to an m−1'th line in said intermediate memory, (4) successively changing the line in the array of the picture elements constituting the original image, which line is scanned, and carrying out the operations of (2) and (3) defined above until maximum value signals are stored along an intermediate line in said intermediate memory, (5) changing the line in the array of the picture elements constituting the original image, which line is scanned, and carrying out the operation of (2) defined above, maximum value signals being thereby stored along the lines ranging from the m'th line to said intermediate line in said intermediate memory, (6) scanning the picture elements, which are located along said intermediate line in said intermediate memory and at which the maximum value signals have been stored, one after another by using said structure element, (7) each time a single picture element located along said intermediate line in said intermediate memory is thus scanned, extracting a minimum value signal, which represents the minimum value of the signal values of the maximum value signals stored at the picture elements overlapping upon said structure element, (B) selecting a minimum value signal, which takes the minimum value among n number of minimum value signals having been extracted with the operations of (A) defined above by using n number of said structure elements, (C) subtracting said selected minimum value signal from the signal value of the original image signal, which corresponds to said selected minimum value signal, and (D) repeating the operation for shifting the line in said intermediate memory, the operation for scanning the line in the array of the picture elements constituting the original image with said structure element, the operation for storing the maximum value signals along the m'th line in said intermediate memory, the operation for scanning said intermediate line in said intermediate memory, which operations are defined in (A) above, the operation for selecting said minimum value signal, which is defined in (B) above, and the operation for the subtraction, which is defined in (C) above, while the line in the array of the picture elements constituting the original image, which line is scanned, is being changed successively and up to the Y'th line.

2. A method as defined in claim 1 wherein said intermediate memory is constituted in a ring-like form such that the first line and the m'th line may be adjacent to each other.

3. A method of extracting an abnormal pattern, wherein maximum value processing and minimum value processing are carried out successively on an original image signal representing an original image, which is constituted of an array of Y lines×X picture elements, by using an m-picture element, n-direction multiply structure element, and an image portion corresponding to a signal change portion, at which the original image signal fluctuates in a spatially narrower range than the size of the multiply structure element, is thereby extracted from the original image, the method comprising the steps of:

(A) carrying out operations of (1) through (7) for each of n number of structure elements constituting the n-direction multiply structure element:

(1) scanning the picture elements, which are located along a line in the array of the picture elements constituting the original image represented by the original image signal, one after another by using one of the structure elements, (2) each time a single picture element of the original image is thus scanned, extracting a minimum value signal, which represents the minimum value of the signal values of the original image signal corresponding to the picture elements overlapping upon said structure element, and storing said minimum value signal in an intermediate memory, which is constituted of a storage space of m lines×X picture elements, said minimum value signal being stored at a picture element on an m'th line in said intermediate memory, which picture element corresponds to the picture element of the original image that is being scanned, (3) after the scanning has been carried out for said single line in the array of the picture elements constituting the original image, shifting the minimum value signals, which have been stored along the m'th line in said intermediate memory, to an m−1'th line in said intermediate memory, (4) successively changing the line in the array of the picture elements constituting the original image, which line is scanned, and carrying out the operations of (2) and (3) defined above until minimum value signals are stored along an intermediate line in said intermediate memory, (5) changing the line in the array of the picture elements constituting the original image, which line is scanned, and carrying out the operation of (2) defined above, minimum value signals being thereby stored along the lines ranging from the m'th line to said intermediate line in said intermediate memory, (6) scanning the picture elements, which are located along said intermediate line in said intermediate memory and at which the minimum value signals have been stored, one after another by using said structure element, (7) each time a single picture element located along said intermediate line in said intermediate memory is thus scanned, extracting a maximum value signal, which represents the maximum value of the signal values of the minimum value signals stored at the picture elements overlapping upon said structure element, (B) selecting a maximum value signal, which takes the maximum value among n number of maximum value signals having been extracted with the operations of (A) defined above by using n number of said structure elements, (C) subtracting said selected maximum value signal from the signal value of the original image signal, which corresponds to said selected maximum value signal, and (D) repeating the operation for shifting the line in said intermediate memory, the operation for scanning the line in the array of the picture elements constituting the original image with said structure element, the operation for storing the minimum value signals along the m'th line in said intermediate memory, the operation for scanning said intermediate line in said intermediate memory, which operations are defined in (A) above, the operation for selecting said maximum value signal, which is defined in (B) above, and the operation for the subtraction, which is defined in (C) above, while the line in the array of the picture elements constituting the original image, which line is scanned, is being changed successively and up to the Y'th line.

4. A method as defined in claim 3 wherein said intermediate memory is constituted in a ring-like form such that the first line and the m'th line may be adjacent to each other.

5. An apparatus for extracting an abnormal pattern, wherein maximum value processing and minimum value processing are carried out successively on an original image signal representing an original image, which is constituted of an array of Y lines×X picture elements, by using an m-picture element, n-direction multiply structure element, and an image portion corresponding to a signal change portion, at which the original image signal fluctuates in a spatially narrower range than the size of the multiply structure element, is thereby extracted from the original image, the apparatus comprising:

i) n number of maximum value signal extracting means, each of said maximum value signal extracting means scanning the picture elements, which are located along a line in the array of the picture elements constituting the original image represented by the original image signal, one after another with one of n number of structure elements, which constitute the n-direction multiply structure element, and extracting a maximum value signal, which represents the maximum value of the signal values of the original image signal corresponding to the picture elements overlapping upon said structure element, each time a single picture element of the original image is thus scanned, ii) n number of intermediate memories, each of which is constituted of a storage space of m lines×X picture elements, said intermediate memories storing maximum value signals, which have been extracted with n number of said structure elements by n number of said maximum value signal extracting means, at corresponding picture elements in said intermediate memories, iii) shifting means for shifting the maximum value signals, which have been stored along an i'th line, where i=2, 3, . . . , m, in each of said intermediate memories, to an i-1'th line in said intermediate memory, iv) n number of minimum value signal extracting means, each of said minimum value signal extracting means operating with respect to one of said intermediate memories, in which the maximum value signals have been stored along lines up to at least an intermediate line among all lines, each of said minimum value signal extracting means scanning the picture elements, which are located along a line in said intermediate memory and at which the maximum value signals have been stored, one after another by using the corresponding structure element, and extracting a minimum value signal, which represents the minimum value of the signal values of the maximum value signals stored at the picture elements overlapping upon said corresponding structure element, each time a single picture element located along said line in said intermediate memory is thus scanned, v) a minimum value selecting means for selecting a minimum value signal, which takes the minimum value among n number of minimum value signals having been extracted by n number of said minimum value signal extracting means, and vi) a subtraction means for subtracting said minimum value signal, which has been selected by said minimum value selecting means, from the signal value of the original image signal, which corresponds to said selected minimum value signal.

6. An apparatus as defined in claim 5 wherein each of said intermediate memories is constituted in a ring-like form such that the first line and the m'th line may be adjacent to each other.

7. An apparatus for extracting an abnormal pattern, wherein maximum value processing and minimum value processing are carried out successively on an original image signal representing an original image, which is constituted of an array of Y lines×X picture elements, by using an m-picture element, n-direction multiply structure element, and an image portion corresponding to a signal change portion, at which the original image signal fluctuates in a spatially narrower range than the size of the multiply structure element, is thereby extracted from the original image, the apparatus comprising:

i) n number of minimum value signal extracting means, each of said minimum value signal extracting means scanning the picture elements, which are located along a line in the array of the picture elements constituting the original image represented by the original image signal, one after another with one of n number of structure elements, which constitute the n-direction multiply structure element, and extracting a minimum value signal, which represents the minimum value of the signal values of the original image signal corresponding to the picture elements overlapping upon said structure element, each time a single picture element of the original image is thus scanned, ii) n number of intermediate memories, each of which is constituted of a storage space of m lines×X picture elements, said intermediate memories storing minimum value signals, which have been extracted with n number of said structure elements by n number of said minimum value signal extracting means, at corresponding picture elements in said intermediate memories, iii) shifting means for shifting the minimum value signals, which have been stored along an i'th line, where i=2, 3, . . . , m, in each of said intermediate memories, to an i-1'th line in said intermediate memory, iv) n number of maximum value signal extracting means, each of said maximum value signal extracting means operating with respect to one of said intermediate memories, in which the minimum value signals have been stored along lines up to at least an intermediate line among all lines, each of said maximum value signal extracting means scanning the picture elements, which are located along a line in said intermediate memory and at which the minimum value signals have been stored, one after another by using the corresponding structure element, and extracting a maximum value signal, which represents the maximum value of the signal values of the minimum value signals stored at the picture elements overlapping upon said corresponding structure element, each time a single picture element located along said line in said intermediate memory is thus scanned, v) a maximum value selecting means for selecting a maximum value signal, which takes the maximum value among n number of maximum value signals having been extracted by n number of said maximum value signal extracting means, and vi) a subtraction means for subtracting said maximum value signal, which has been selected by said maximum value selecting means, from the signal value of the original image signal, which corresponds to said selected maximum value signal.

8. An apparatus as defined in claim 7 wherein each of said intermediate memories is constituted in a ring-like form such that the first line and the m'th line may be adjacent to each other.

* * * * *